United States Patent [19]
Van Melle et al.

[11] 3,764,025
[45] Oct. 9, 1973

[54] DEVICE FOR ORIENTING AND STACKING FRUSTOCONICAL ARTICLES

[75] Inventors: Hugh Van Melle, Islington, Ontario; Herbert Rees, Toronto, Willowdale, Ontario, both of Canada

[73] Assignee: Husky Manufacturing & Tool Works Limited, Toronto, Ontario, Canada

[22] Filed: Apr. 30, 1971

[21] Appl. No.: 139,238

Related U.S. Application Data

[62] Division of Ser. No. 19,978, March 16, 1970, Pat. No. 3,623,593.

[52] U.S. Cl. .................................... 214/7, 214/6.5
[51] Int. Cl. ............................................ B65g 57/00
[58] Field of Search .................... 214/6.5, 6 N, 7; 93/93 HT

[56] References Cited
UNITED STATES PATENTS

| | | | |
|---|---|---|---|
| 3,389,811 | 6/1968 | Frank | 214/6.5 |
| 2,833,185 | 5/1958 | Dixon | 214/7 UX |
| 2,954,881 | 10/1960 | Hopton et al. | 214/7 X |
| 3,228,538 | 1/1966 | Coates | 214/7 |
| 2,996,198 | 8/1961 | Packman | 214/7 X |
| 3,127,029 | 3/1964 | Luginbuhl | 214/7 X |
| 3,497,086 | 2/1970 | Adams et al. | 214/7 |

FOREIGN PATENTS OR APPLICATIONS
1,067,728  10/1959  Germany .......................... 215/6.5

Primary Examiner—Robert J. Spar
Attorney—Karl F. Ross

[57] ABSTRACT

A series of frustoconical plastic cups coming from an injection-molding machine alight on a vibratile trough directing them onto a pair of ascending, parallel conveyor belts between which they are suspended with their smaller end down. At the output end of the conveyor the belts are twisted and spread apart to release the cups which are picked up by a vibratile chute for stacking against an end stop. The latter may be preceded by a detent retractable under the control of a photocell, disposed upstream along the chute, which detects the trailing end of a stack of cups and closes a gate to prevent the advance of further cups past the cell while a lifting fork raises the stack to the level of an adjoining table onto which the stacked cups are swept by a swingable arm. The trough may be tiltable into a reverse position to guide scrap away from the elevating conveyor at the beginning of a series of molding operations.

8 Claims, 15 Drawing Figures

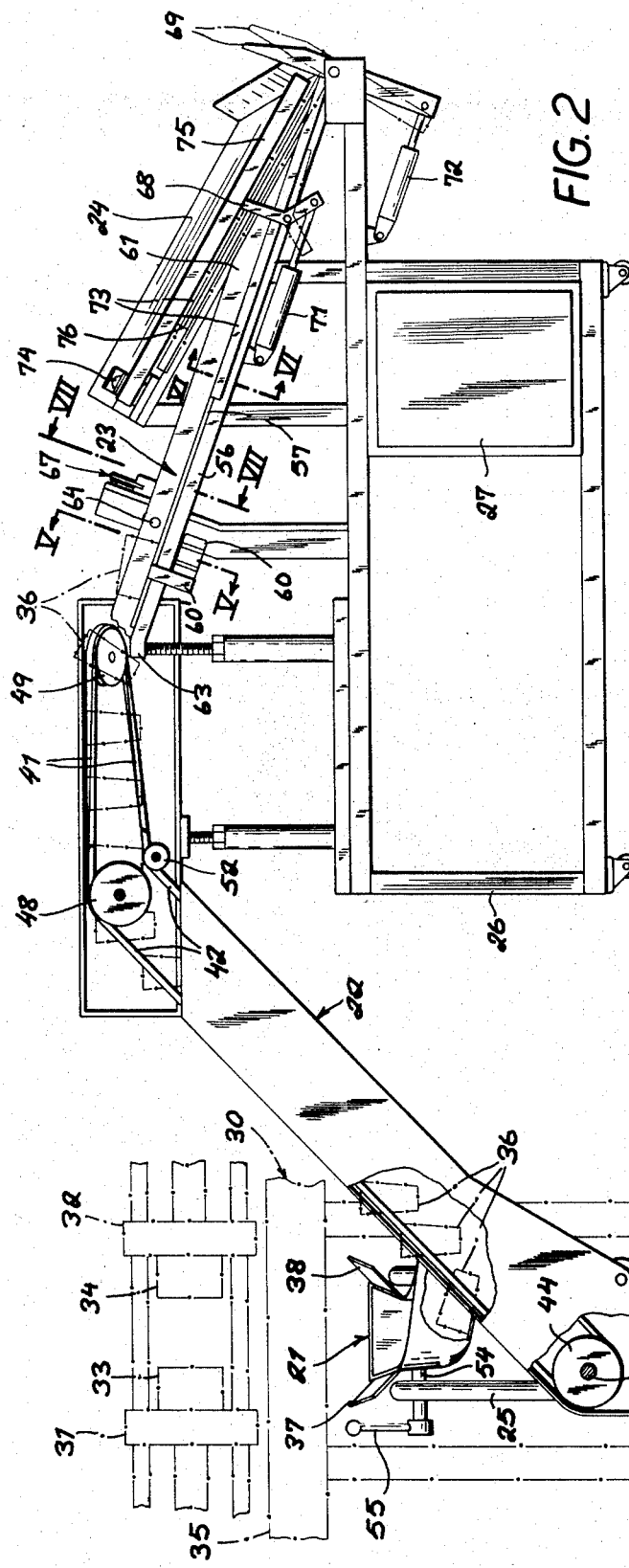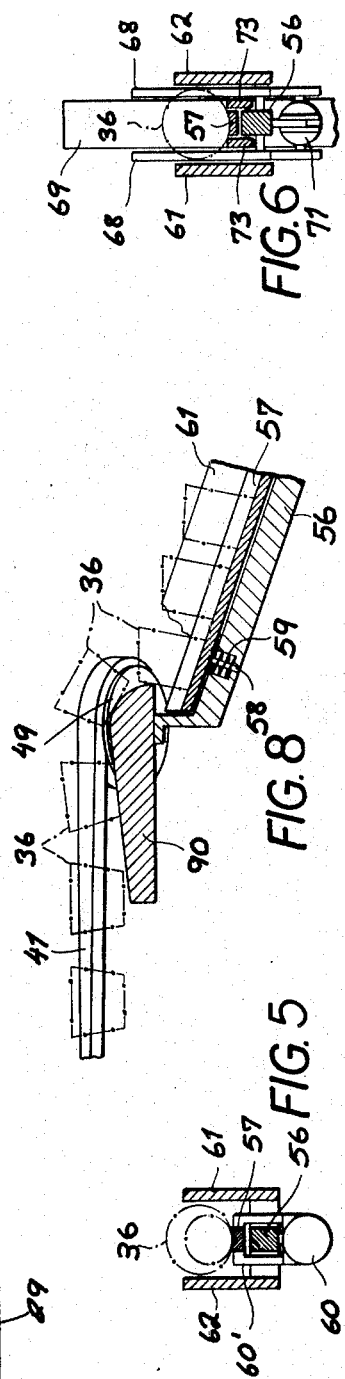

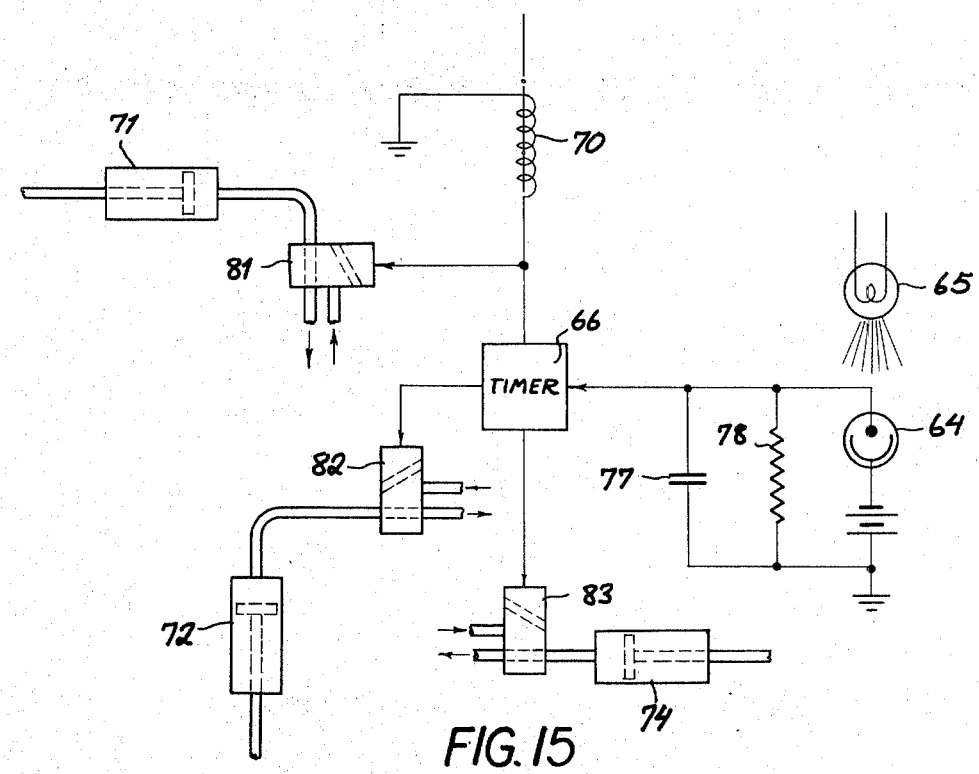
FIG. 15
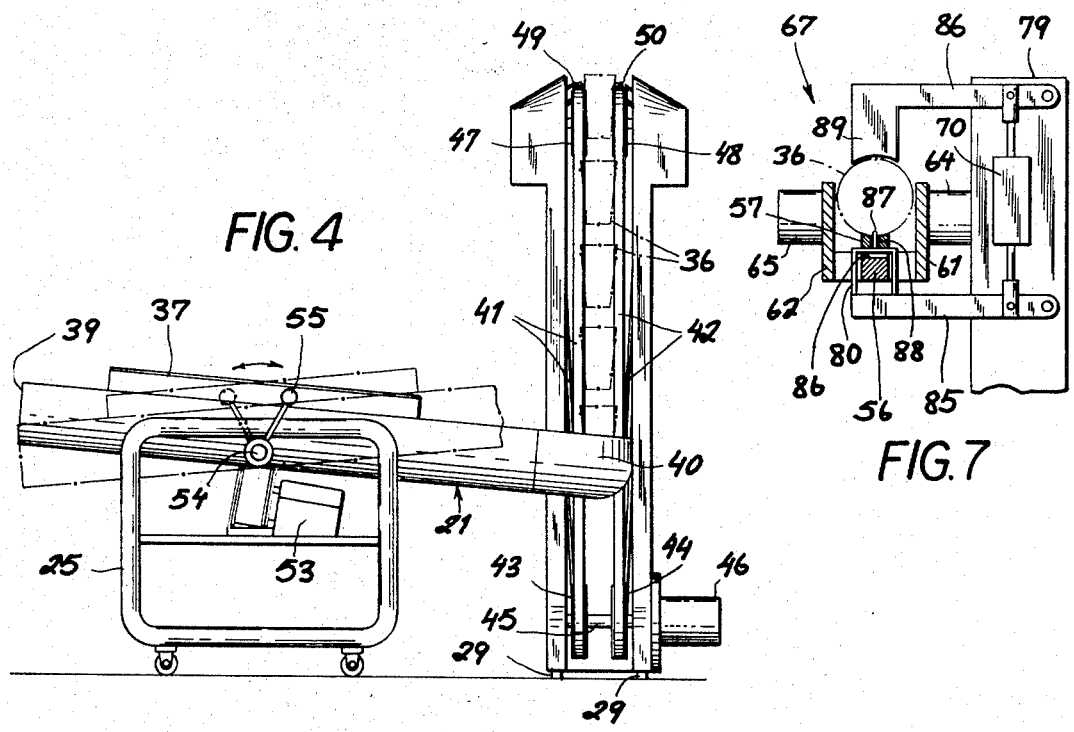
FIG. 4
FIG. 7 ns. 3,764,025

DEVICE FOR ORIENTING AND STACKING FRUSTOCONICAL ARTICLES

This application is a division of application Ser. No. 19, 798, filed Mar. 16, 1970 now U.S. Pat. No. 3,623,593.

Our present invention relates to a device for collecting and removing, preferably in an oriented fashion, articles serially produced by an injection-molding machine, more particularly hollow articles of generally frustoconical shape (such as drinking cups) adapted to be nested one in the other for transportation and storage in stacked form. In its broader aspects, the invention also relates to a device for orienting and stacking such articles from sources other than injection-molding machines.

Conventional injection-molding machines of the horizontal-bed type have a frame which provides sufficient clearance beneath the bed for the insertion of a receptacle of catch the molded articles ejected in the open-mold position. These articles are deposited with random orientation in the receptacle and must later be sorted, oriented and stacked (where appropriate) preparatorily to further handling. This tedious and time-consuming work often prevents full utilization of the operating capacity of high-speed molding machines.

An important object of our invention, therefore, is to provide a device designed to perform automatically the collecting, orienting and stacking of a succession of identical articles, of the configuration described, at a speed commensurate with the output rate of an injection-molding machine or other associated supply source.

A more specific object is to provide means in such device for counting the number of received articles by assembling them into stacks of given length and individually transferring each stack to a receiving surface therefor.

Another object is to provide a device for the collection and removal of molded articles with a feeding station positionable under the bed of a conventional molding machine, in lieu of the usual basket or other receptacles, and with a receiving station remote from the machine bed whereby the further handling of these articles will not interfere with the operation of the machine itself.

A device according to our invention includes, basically, a downwardly inclined trough into which the articles to be collected, oriented and/or stacked are dropped from above, a rising conveyor picking up the articles successively arriving at the lower end of the trough for transporting them to an elevated level, and a chute receiving the articles from the conveyor at that level for delivery to a final station. The trough, advantageously, is set in continuous vibration and converges toward its lower end where it terminates in a laterally open elbow whereby, with the trough positioned under the bed of an injection-molding machine, the conveyor may run generally parallel to the machine bed on the side remote from the machine operator's post to carry the molded articles to their destination. Pursuant to another advantageous feature, the trough may be swingable into an inversely inclined position so that the intercepted moldings move to the normally elevated front end of the trough, next to the operator's post, for purposes of inspection and possible removal; thus, at the beginning of a production run, the operator may divert the scrap generally produced during the first few cycles and may direct the machine output toward the conveyor only after the first perfectly molded pieces begin to appear.

A further feature of our invention resides in the provision of a preferably photoelectric detector positioned along the chute upstream of a stop means designed to arrest the first of a series of articles to be stacked, the detector ascertaining the growth of the stack to a predetermined length and thereupon actuating a sweeper which transfers the stack to an adjoining receiving surface. Advantageously, the stop means includes a detent and an end stop beyond the latter, the detent being retractable under the control of the detector to let the stack slide down to a lower position (until arrested by the end stop) while a normally open gate in the vicinity of the detector closes temporarily to prevent further oncoming articles from following the descending stack. In its lower position, i.e. upon engagement of the end stop, the stack may be elevated by a lifting mechanism to the level of the receiving surface before the sweeper goes into action, thereby clearing a lateral wall of the chute on the side of the receiving surface.

In accordance with still another feature of our invention, the rising conveyor includes a pair of endless belts which move parallel to each other from the entry point at the trough outlet to the elevated exit point above the chute, a first portion of their path being inclined at an acute angle (e.g. of 30° to 60°) to the horizontal while an adjoining second portion of this path is substantially horizontal. This change in direction insures a certain minimum separation of the articles successively reaching the conveyor outlet, especially in the case of articles whose height exceeds their largest diameter, as will be explained in greater detail hereinafter. The spacing of the two belts along their parallel path is less than the maximum diameter but greater than the minimum diameter of the frustoconical articles whereby the latter are gripped by the belts near their major base, hanging down into the space between the belts until released therefrom at the exit point where the belts are spread apart by passing over suitably shaped support means such as a pair of upwardly toed-in or converging pulleys. Stationary guide means may be provided at that point to help direct the articles with the proper attitude onto the chute which we prefer to provide with a vibratile bottom to facilitate the descent of the cups to be stacked.

The above and other features of our invention will become more clearly apparent from the following detailed description, reference being made to the accompanying drawing in which:

FIG. 2 is a side-elevational view of the device with certain parts broken away;

FIG. 4 is an end view of the device, showing details of its feeding section;

FIGS. 5, 6 and 7 are cross-sectional views taken on the lines V — V, VI — VI and VII — VII, respectively, of FIG. 2 but drawn to a larger scale;

FIG. 8 is a fragmentary detail view taken at the junction of a conveyor and a chute forming part of the device;

FIG. 15 is a circuit diagram relating to the device.

Figure 1:
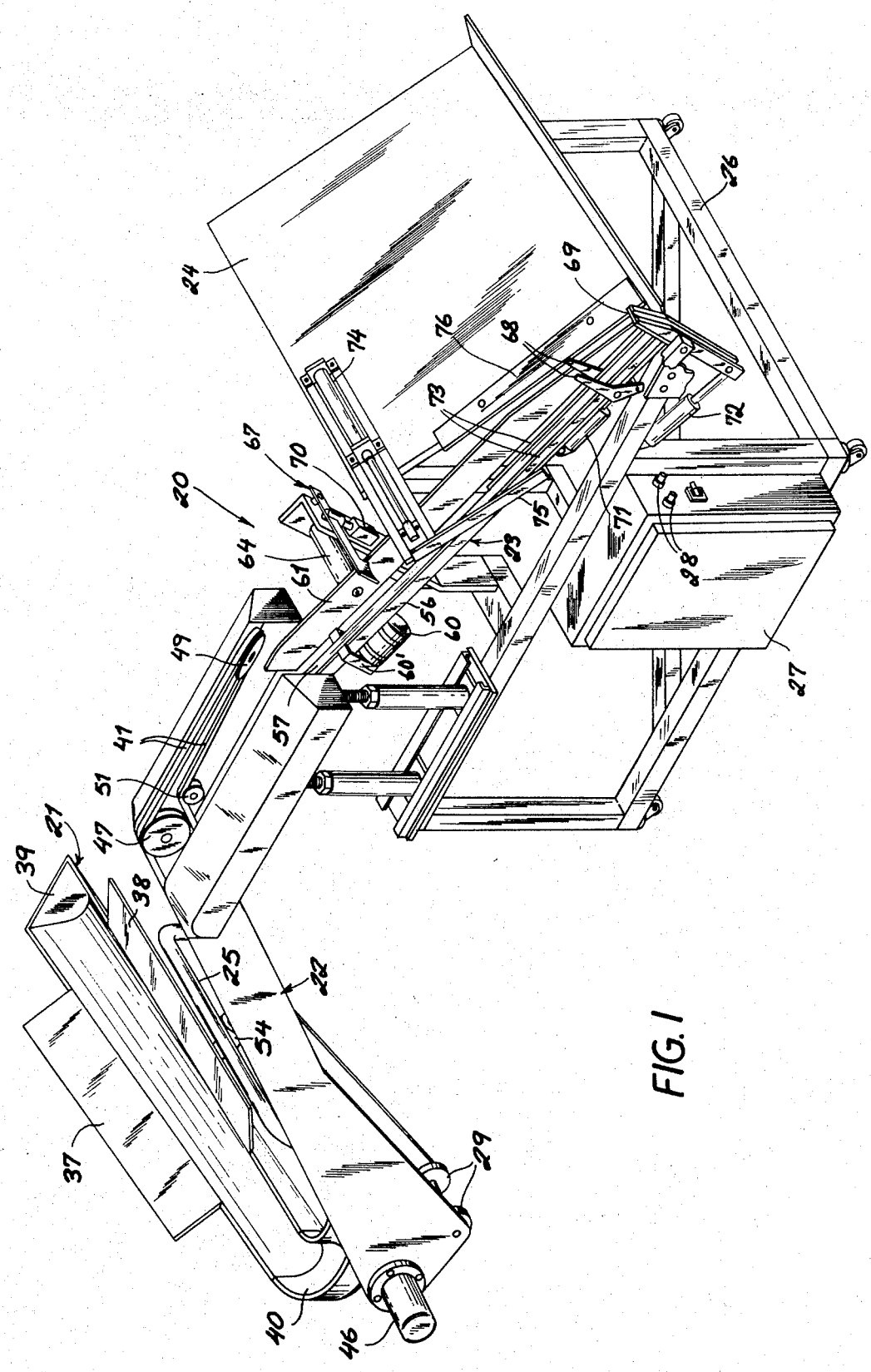
FIG. 1 is an overall perspective view of a device embodying our invention.
Figure 3:
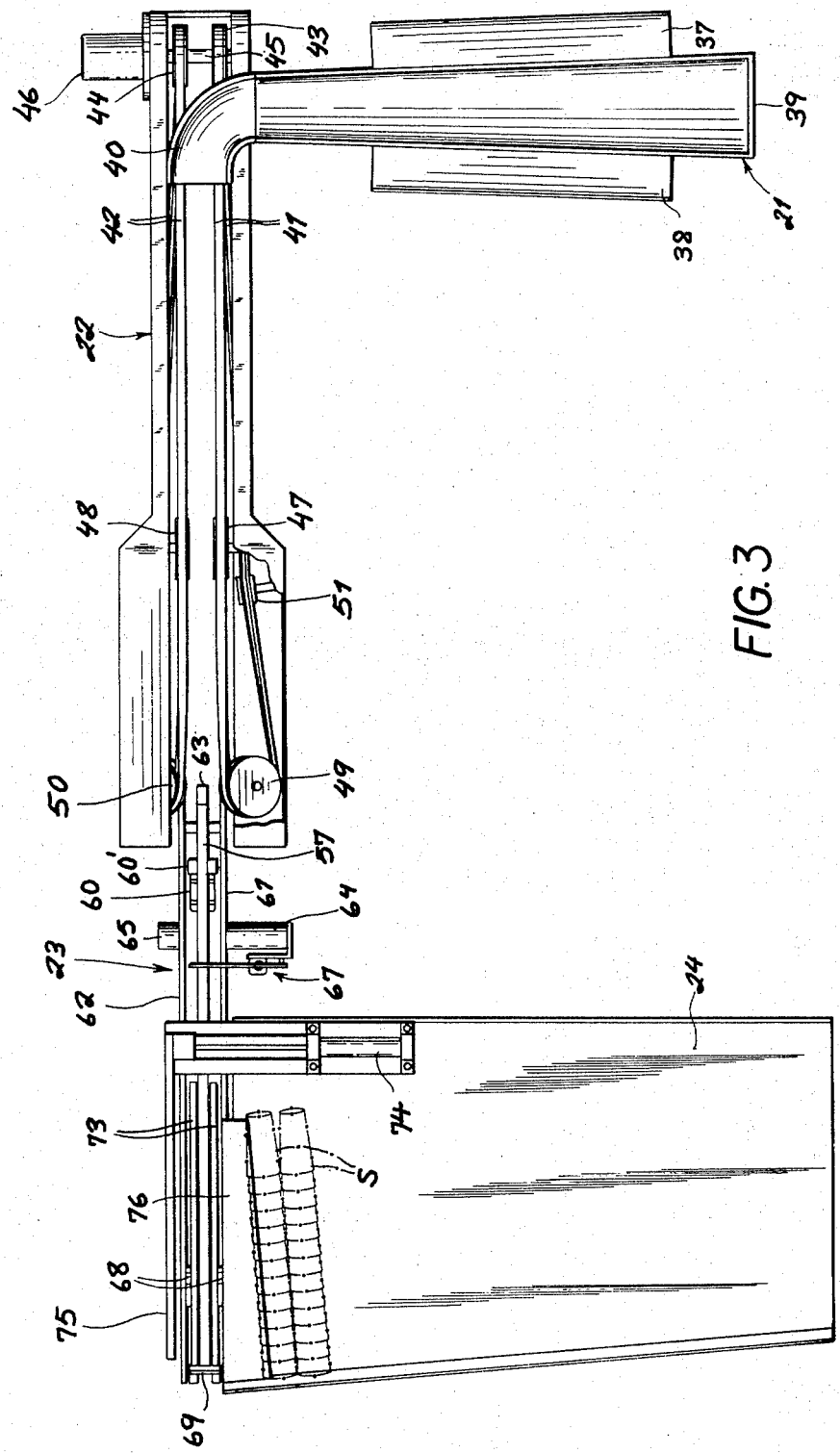
FIG. 3 is a top plan view of the device.

Reference will first be made to FIGS. 1–3 for a description of the overall construction and general mode of operation of a system embodying our invention.

The assembly collectively designated 20 comprises three basic constitutents, i.e. an input station consisting primarily of a vibrating trough 21, a conveyor 22, and an output station with a vibrating chute 23 adjoining a receiving surface 24 in the form of an inclined table. For the sake of mobility, trough 21 is supported on a wheeled carriage 25 whereas units 23 and 24 are mounted on a wheeled base 26 which also carries a control panel 27 with switches 28 for starting and stopping the operation of the various electrical drives. Conveyor 22 rests on a pair of casters 29 besides being anchored to base 26.

As illustrated in phantom lines in FIG. 2, an injection-molding machine 30 with two relatively movable platens 31, 32 and mold halves 33, 34 has a bed 35 which forms a clearance beneath the mold to accommodate the trough 21 and its carriage 25; bed 35 has an opening, not shown, for the passage of molded articles ejected from the mold cavity or cavities when the platens are separated. These articles, in the shape of frustoconical cups 36 open at their wider end, are intercepted by the trough 21 which for this purpose has a pair of upwardly divergent wings 37, 38 and which tapers slightly from its closed higher end 39 to an elbow 40 at its lower end, the elbow opening onto the conveyor 22 between a pair of endless belts 41, 42 forming part thereof. The belts 41, 42 pass around a pair of lower V-pulleys 43, 44 on a shaft 45 driven by a motor 46; see also FIG. 4. The belts then move on an incline of about 45° to another pair of mutually parallel but nondriven V-pulleys 47, 48 whence they continue substantially horizontally and still parallel to each other to a further pair of idler pulleys 49, 50 which are disposed in upwardly converging planes so as to occupy a toed-in position. Thus, the belts 41 and 42 are spread apart upon passing around the pulleys 49 and 50, returning thereafter by way of small idler rollers 51, 52 to the driven pulleys 43, 44. The spacing of the belts along their parallel run is so chosen as to be less than the major diameter but more than the minor diameter of the cups 36; taking into account the elastic lateral yielding of the belts when a cup is clamped therebetween, this spacing should be such that the cup is gripped near its broader rim so that its center of gravity lies well below the plane of the belts whereby the cup is urged by its own weight into an erect position both along the inclined belt portion and on the horizontal stretch between pulleys 47, 48 and 49, 50. The change of angle at the roller pair 47, 48 automatically increases, by a factor of $\sqrt{2}$, the spacing of adjoining cups so as to insure a certain separation thereof even if they are picked up by the belts in immediate succession from trough exit 40.

The vibration of trough 21, designed to let the cups 36 reach the exit 40 in axial alignment but not necessarily with the same orientation, is brought about by an electric motor 53 (FIG. 4) mounted on the underside of the trough and provided, for example, with an eccentrically weighted shaft as is well known per se.

As further shown in FIG. 4, the trough 21 is pivotable around an axis 54 carrying a lever 55 which can be manually swung into an alternate position to incline the trough in the opposite direction, as illustrated in dot-dash lines, whereby the moldings dropping through the machine bed 35 move toward the closed end 39 rather than toward the elbow 40. The operator, standing near that closed end on the side of the machine remote from conveyor 22, may then inspect these moldings and remove them from the trough if, as will generally be the case at the beginning of a production run, they are imperfectly shaped so as to constitute scrap to be reground.

The chute 23, adjoining the delivery end of conveyor 22, comprises a stationary beam 56 supporting a substantially coextensive strip 57 which is connected with the beam at several longitudinally spaced locations by means of sliding pins 58 and surrounding coil springs 59 (FIGS. 8 and 9) so as to be movable in a vertical plane; a motor 60, secured to the underside of the beam 56 as shown in FIGS. 1, 2 and 5, drives a yoke 60' which straddles the beam and is secured to the strip 57 to vibrate the latter in that vertical plane. Chute 23 also comprises a pair of sidewalls 61, 62 which flank the strip 57 and are rigid with beam 56; sidewall 62 has been removed in FIGS. 1 and 2 for the sake of clarity.

As best shown in FIG. 2, beam 56 has an adjustably mounted upper end 63 positioned between the diverging lower halves of pulleys 49 and 50 to engage the bottom of an oncoming cup 36 for tripping same forwardly whereby the cup lands on the vibratile strip 57 with its open end forward and with an invariable attitude conducive to the stacking of successive cups. A photoelectric detector, constituted by a photocell 64 confronting a lamp 65, monitors the prolonged presence of a cup 36 in the light path of the lamp to actuate a timer 66 (FIG. 15) which controls a gate 67, a retractable detent 68 and a mobile end stop 69 positioned at successively lower locations along the chute. Gate 67 is normally open to allow the oncoming cups 36 to slide toward the detent 68 normally rising athwart their path whereby the first cup is arrested and subsequent cups arrive in nested relationship therewith and with one another to form a progressively growing stack which ultimately reaches the region of photocell 64. Timer 66 then operates a solenoid 70 (FIG. 7), forming part of gate 67, and a hydraulic or pneumatic jack 71 which trips the detent 68 into a recumbent position (dot-dash lines, FIG. 2) below the level of strip 57 whereby the stack is released to slide down to the end stop 69. Timer 66 thereupon actuates another jack 72 which tilts a lifting fork 73, rigid with end stop 69, into a raised position wherein this fork lies in the plane of receiving table 24 as indicated in dot-dash lines in FIG. 2; as best seen in that Figure, the angle of inclination of the table surface to the horizontal is about 30° whereas the corresponding angle of chute 23 is approximately 20°. Next, a further jack 74 controlled by timer 66 displaces an arm 75 across the fork 73 and part of the table 24 to sweep the stack S (FIG. 3) from the prongs of that fork onto the table surface, past a stationary strip 76 acting as a backstop to prevent the stacked cups from returning to the chute. Table 24, as shown, also slopes upwarding in a direction away from the chute 23 at a small angle to prevent the cups from rolling over the far edge. With the gate 67 closed at this time, the advance of further cups past the monitoring zone at photocell 64 is prevented while the fork 73 is raised. After the fork 73 and the sweep arm 75 have been restored to normal, the timer re-erects the detent 68 and reopens the gate 67 so that a new stack may be formed. Since the height of this stack is determined by the distance of detent 68 from photocell 64, and since the cups 36 are all identical, a substantially constant number of cups make up each stack whereby a count of the molded articles is obtained; a multiplicity of such stacks can be deposited side by side on the table 24 by the operation of arm 75 preparatorily to further disposition.

In order to prevent the photocell 64 from responding to cups sliding past toward the detent 68, the output circuit of this photocell includes an integrating network consisting of a condenser 77 and a resistor 78 as illustrated in FIG. 15. Timer 66 is triggered only after the charge on condenser 77 has dropped to a certain level, i.e. after the photocell 64 has been cut off for a predetermined length of time (which may be a fraction of a second) indicative of the interposition of a quiescent cup between the cell and the light source 65. Three valves 81, 82, 83, operated by the timer, control the admission of working fluid to the jacks 71, 72, 73, respectively.

As best seen in FIG. 6, the prongs of fork 73 are bracketed by a pair of fingers forming the detent 68, these prongs and fingers being disposed in longitudinal gaps between the beam 56 and the sidewalls 61, 62. This Figure also shows that the upper surface of strip 57 is cylindrically concave to conform, substantially, to the curvature of cups 36, the upper edges of prongs 73 forming a continuation of this concave supporting surface.

FIG. 7 illustrates details of the gate 67. A post 79 rigid with frame 26 (and therefore with beam 56) carries a pair of levers 85, 86 interconnected by the solenoid 70, the lower lever 85 being rigid with a bracket 80 partly received in a recess 86 of beam 56. A normally retracted pin 87 on bracket 80 traverses a hole 88 in strip 57 and projects above that strip when the solenoid 70 is energized, a block 89 on upper lever 86 descending at the same time onto the rim of a cup 36 stopped by the pin 87 so as to prevent that cup from skipping over the pin. It will be noted that the cup is not clamped by this action and that the strip 57 remains free to vibrate as described above.

In the foregoing description it has been assumed that the products to be stacked have a height at least equal to their largest diameter to exclude any possibility that the cups pass sideways through the elbow 40 and fall between the two conveyor belts 41, 42. With shallower articles, however, special precautions must be taken to ensure their proper positioning in the feed trough and their correct transfer from the conveyor belts to the delivery chute 23.

For the latter purpose, as shown in FIG. 8, we may dispose a stationary guide member 90 between the two belts, the upper surface of this member forming a ramp that rises between pulleys 49 and 50 to a level sufficient to disengage the cups 36 from the grip of the belts at a point just beyond the zenith of the pulleys whereby the cups are directed over the rounded front edge of the ramp, either by their own momentum or by the thrust of the next-following cups, so as to alight on the curved strip 57 with the correct attitude, i.e. with their axis substantially horizontal and with forwardly facing open end.

Figure 9:
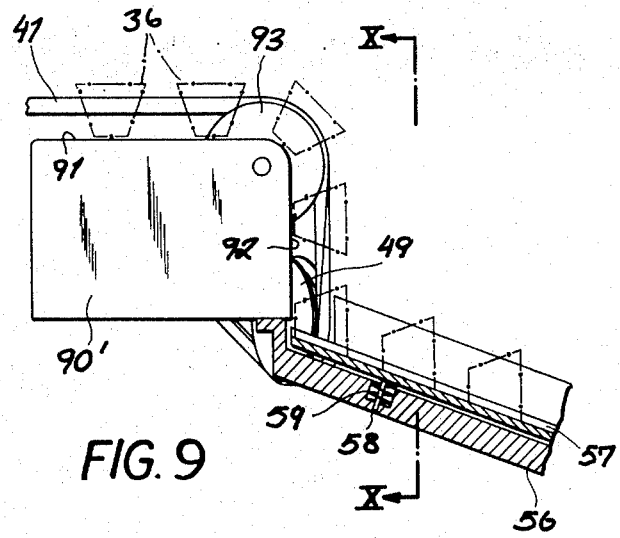
FIG. 9 is a view similar to FIG. 8, showing a modification.
Figure 10:
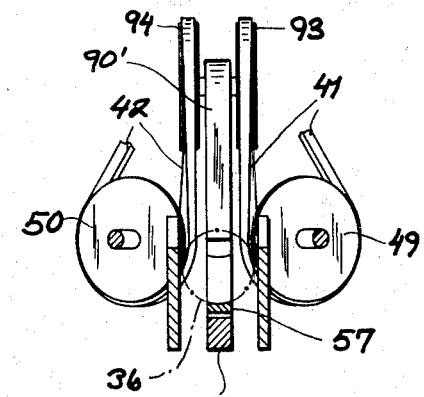
FIG. 10 is a sectional view on the line X — X of FIG. 9.

An alternate solution is shown in FIGS. 9 and 10 where a fixed member 90' forms a horizontal guide surface 91 and a vertical guide surface 92 close to the bottoms of the cups 36 but without disengaging them from the belts 41, 42 which, in this case, pass around a further pair of parallel idler pulleys 93, 94 before reaching the toed-in pulleys 49, 50, the latter being here located below the pulleys 93, 94 so as to define therewith a short vertical run on which the belts remain parallel to retain their grip of the cups. These cups, therefore, are positively directed into their stacking attitude and are released from the belts just before striking the vibratile strip 57.

Figure 11:
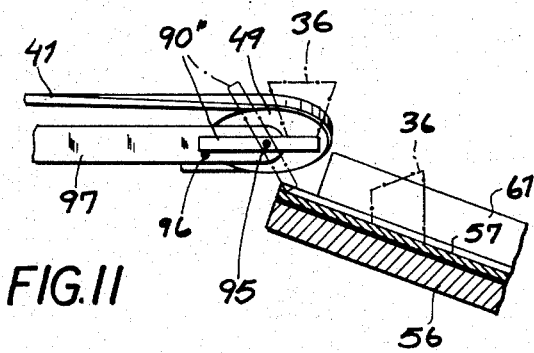
FIG. 11 is a further view similar to FIG. 8, illustrating another modification.
Figure 12:
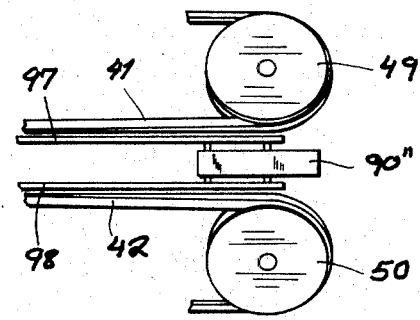
FIG. 12 is a plan view of the detail shown in FIG. 11.

FIGS. 11 and 12 show a further modification in which a rocker member 90'' is swingably mounted on an axle 95 between two fixed arms 97, 98. Axle 95 lies below the upper run of the belts 41, 42 at the level of the oncoming cups 36, the slightly heavier rear half of this member normally resting on a cross-pin 96. When a cup 36 alights on the projecting front part of that member, its weight tips the same into an inclined position (dot-dash lines, FIG. 11) in which its front edge comes to rest on strip 57 to deposit the cup thereon in a position in which the curvature of the strip 57 and the momentum of the descent ensure the correct positioning of the cup.

Figure 13:
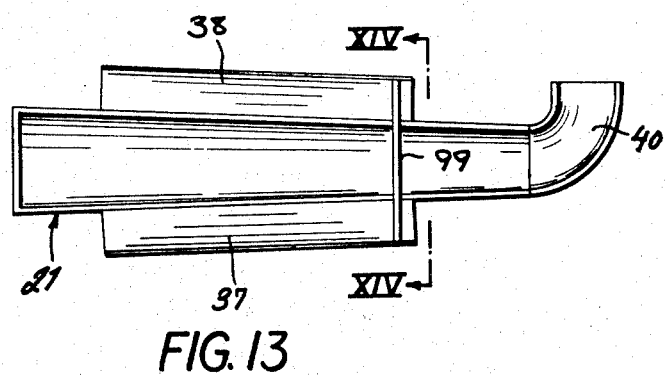
FIG. 13 is a top view of a modified feeding trough forming part of a device according to the invention.
Figure 14:
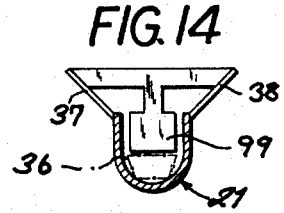
FIG. 14 is a cross-sectional view taken on the line XIV — XIV of FIG. 13.

FIGS. 13 and 14 show a baffle 99 from above in trough 21 at a distance from its bottom slightly exceeding the height of a shallow cup 36 whereby the latter can advance toward the trough exit 40 only when lying on one of its major surfaces, i.e. on the larger or the smaller base of the frustocone. On leaving the elbow 40, the cup will therefore be gripped at diametrically opposite peripheral points by the two conveyor belts so that the system will properly operate in the manner described above.

Advantageously, the inclination of chute 23, the distance of detent 68 from detector 64, 65, the transverse spacing of belts 41, 42 and other parameters of the disclosed system should be adjustable to accommodate cups or similar workpieces of different dimensions.

Baffle 99 is preferably secured to a nonvibrating support.

We claim:

1. A device for stacking hollow frustoconical articles in nested relationship, comprising:
   transport means forming a path including a downwardly sloping track for the conveyance of a succession of articles to be stacked;
   feed means for supplying said articles to said path in coaxial and codirectional positions;
   stop means in a terminal portion of said track for halting one of said articles with progressive nesting of oncoming further articles to form a stack, said stop means including a retractable detent and an end stop beyond said detent;
   detector means disposed along said track for ascertaining the growth of the stack;
   sweep means alongside said path responsive to said detector means for transferring a stack so formed onto an adjacent receiving surface located at least partly above said track, said detent being provided with operating means responsive to said detector means for retracting same prior to actuation of said sweep means to let said stack bodily drop along said track to a lower position into engagement with said end stop, said sweep means including an arm juxtaposed with the stack in said lower position thereof, said detent being restorable by said operating means upon completion of a stack transfer; and lifting means between said end stop and said detent controlled by said detector means for elevating the stack from said track to the level of said receiving surface prior to actuation of said sweep means.

2. A device as defined in claim 1 wherein said path is provided with normally open gate means in the vicinity of said detector means and with actuating means responsive to said detector means for closing said gate means substantially concurrently with the retraction of said detent for preventing subsequent articles from following the stack to said lower position.

3. A device as defined in claim 1 wherein said lifting means comprises an elongate member pivotable about a transverse axis at the end of said track.

4. A device as defined in claim 3 wherein said end stop comprises an upstanding formation rigid with said member.

5. A device as defined in claim 3 wherein said elongate member is bifurcate and straddles a central strip portion of said track.

6. A device as defined in claim 5 wherein said track is provided with vibrating means for continuously oscillating said central strip portion in a vertical plane.

7. A device as defined in claim 1 wherein said sweep means comprises an arm movable across said track just above the level of said receiving surface, further comprising backstop means on said receiving surface lying within the sweep of said arm for preventing a return of a transferred stack to said track.

8. A device as defined in claim 1 wherein said receiving surface is inclined to the horizontal at a steeper angle than said track.

* * * * *